United States Patent Office 3,419,534
Patented Dec. 31, 1968

3,419,534
POLYMERS FROM POLYMERIZED UNSATURATED MATERIALS AND URETIDONE DIMERS
Isaac Goodman and John Edward Martin, Runcorn, England, assignors to Imperial Chemical Industries Limited, London, England, a corporation of Great Britain
No Drawing. Filed July 7, 1966, Ser. No. 563,391
Claims priority, application Great Britain, July 13, 1965, 29,627/65
6 Claims. (Cl. 260—77.5)

ABSTRACT OF THE DISCLOSURE

Cross-linkable compositions comprising a copolymer of ethylene and an ethylenically unsaturated carboxylic acid amide, preferably acrylamide and methacrylamide and a uretidone dimer of an organic polyisocyanate. The compositions are shaped by a process which involves heating to a temperature at which the polymer is in the fluid state, shaping and subsequently heating the shaped article at 150° to 200° C.

---

This invention relates to cross-linkable compositions containing thermoplastic polymers of the kind derived from the polymerisation of mono-ethylenically unsaturated monomers.

Polymers derived from mono-ethylenically unsaturated monomers generally soften or flow on heating and then revert to the solid state on cooling. The cycle can be repeated and this property of permanent fusibility, or thermoplasticity as it is more generally termed, is the prime reason for the utility of these polymers as moulding materials since they can readily be shaped in the softened or molten state at moderately elevated temperatures on suitably designed machinery, e.g. injection- and compression-moulding equipment, presses, vacuum-forming equipment, rotational-casting equipment and extruders.

Wider applications for these thermoplastic polymers could be envisaged, however, if their tendency to soften and flow at these moderately elevated temperatures could be reduced after the shaping process has been completed.

Such reduction can be achieved by cross-linking; a reaction which involves forming chemical links between adjacent polymer chains, either by creating inter-reactable sites on the polymer chains or chemically by introducing a polyfunctional compound capable of reacting with repeating units in the polymer chains, thereby forming a macromolecular network. Methods of cross-linking that have found commercial success, especially in the field of polyethylenes, utilise the former alternative and involve the use of high energy irradiation or the incorporation of free radical generators such as peroxides. Irradiation methods are complex, difficult to control and costly if high dosages are required and have only found limited application. The incorporation of peroxides, on the other hand, has been found to yield compositions which tend to cross-link during shaping on conventional machinery such as injection- and compression-moulding machines and extruders whilst in the thermoplastic state and although this disadvantage can be overcome to some extent by modifying the equipment to shorten the dwell times, or by using peroxides having higher dissociation temperatures, both solutions are expensive.

Hitherto, the examination of chemical cross-linking methods has not been successful because premature reaction between the polymer and polyfunctional cross-linking agent has generally occurred, thereby rendering shaping difficult if not impossible. However, we believe that we have now reduced the danger of premature reaction by choosing as the polymeric component a copolymer which contains active hydrogen atoms and as the polyfunctional cross-linking agent to be combined therewith a compound, hereinafter referred to as a polyisocyanate-generator, which is thermally dissociable to polyisocyanate (i.e. a compound having at least two isocyanate groups). Our experiments have shown that these compositions may be subjected to thermal processes, e.g. milling or shaping, at moderately elevated temperatures, e.g. 120° C., for several minutes without inducing undue cross-linking and yet may be cross-linked quite readily by a further increase in temperature. This is because the polyisocyanate generator does not dissociate to yield polyisocyanate at the lower temperatures.

Accordingly our invention provides a cross-linkable polymeric composition comprising (i) A copolymer in which the majority of the units making up the polymer chains are derived from mono-ethylenically unsaturated monomeric material polymers of which are thermoplastic and a minor number of the units are derived from a comonomer and contain active hydrogen atoms, and (ii) A polyisocyanate-generator.

Our invention also provides a process for obtained cross-linked polymer compositions by heating said copolymer with a polyisocyanate-generator at a temperature above the thermal dissociation temperature of said polyisocyanate-generator.

It will be readily apparent that this invention is applicable in general to copolymers derived from any mono-ethylenically unsaturated monomer from which thermoplastic polymers may be derived, either by homopolymerisation or copolymerisation with suitable comonomers. All that is required is that said monomers are copolymerisable with comonomers which will provide in the resulting polymer chain units which either have active hydrogen atoms or are convertible to forms having active hydrogen atoms. As is well known, said monomers are commonly found is the group having the structure $CH_2=CR_1R_2$ where $R_1$ is generally hydrogen, monovalent hydrocarbon, halogen or nitrile and $R_2$ is hydrogen, alkyl, halogen,—OCOR or COOR where R is monovalent hydrocarbon. The most common examples are vinyl chloride (which yields thermoplastic polymers and copolymers), ethylene, methyl methacrylate and styrene but others include vinylidene chloride and acrylonitrile (the thermoplastic products of both of which are generally copolymers). The invention is particularly described hereinafter with reference to polymers of ethylene but is applicable with equal effect to polymers of these other monomers.

These monomers (or mixtures thereof) are copolymerised with suitable comonomers to yield the copolymers which form one component of our cross-linkable compositions. The comonomer will either contain an active hydrogen atom or will yield units in the polymer chains which may be converted to units containing active hydrogen atoms, e.g. by hydrolysis or by reduction. Active hydrogen atoms are most conveniently found in hydroxyl (—OH), carboxylic acid (—COOH) or amino (—NH$_2$) groups and thus examples of the first kind of comonomer can include, e.g. acrylic acid and methacrylamide and examples of the second kind of comonomer can include hydrolysable vinyl esters, e.g. vinyl acetate. Other but less readily available sources of active hydrogen atoms are, for example, groups containing —SH combinations and as a general statement it may be said that active hydrogen atoms can be found linked to atoms found in the first two occupied periods of Groups V and VI of the Periodic Table of the Elements. A test for an active hydrogen atom is described in "Rodd's Chemistry of Carbon Compounds," second edition, vol. IA, p. 62.

By reason of general availability of the parent comonomers, we have found that repeating units having active hydrogen atoms generally have the structure

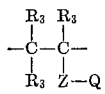

where each $R_3$ is selected from hydrogen or a monovalent hydrocarbon radical (generally an alkyl group having from 1 to 6 carbon atoms or a phenyl group) or the group —Z—Q, Z is a divalent organic radical or a direct linkage and Q is a polar radical having an —OH, —SH, >NH or —$NH_2$ group. In general no more than one R will be —Z—Q. Where Z is not a direct linkage, it is preferably a divalent hydrocarbon radical (e.g. methylene, polymethylene, phenylene, etc.) but may also comprise, for example, a chain of carbon atoms interspersed with other atoms, e.g. —$(CH_2)_2O(CH_2)_2$—. Ordinarily, the use of residues wherein Z is a divalent organic radical has little or no advantage over the use of residues where Z is a direct linkage and for reasons of economy and availability of the parent comonomers, therefore, it is advisable to use the latter.

Q may be any polar radical containing an —OH, —SH, >NH or —$NH_2$ group and examples include: —$NX_2$, —$CONX_2$, —$SO_2NX_2$, —$CONX.NX_2$, —$SO_2NX.NX_2$, —$NX.CONX_2$, —C(:NX)$NX_2$, —C(:NOX)$NX_2$, —NX.OX, —COOH, —CO.OR'OH, —O.CO.R''OH, —OH, —SH, —P(:O)OH, —CH:NOH and —$C_6H_4$OH where in each radical at least one X represents a hydrogen atom, other X's being hydrogen atoms or monovalent hydrocarbon radicals, R' represents a divalent hydrocarbon group having a structure such that a phenylene group and/or a chain of at least 2, and generally from 2 to 10, carbon atoms links the ester group to the hydroxyl group and R'' represents a divalent hydrocarbon group having a structure such that a phenylene group and/or a chain of one or more carbon atoms (generally 1 to 10 carbon atoms) links the ester group to the hydroxyl group. However, Q will commonly be —OH, —$CONH_2$ or —COOH; examples of readily available comonomers containing Q being acrylamide, methacrylamide, acrylic acid, methacrylic acid, 2-hydroxyethyl methacrylate, 2-hydroxyethyl acrylate and similar derivatives of methacrylic acid or acrylic acid and higher alkylene oxides.

Since the reaction of polyisocyanates with polymers having —COOH groups tends to yield carbon dioxide and since many polymers having hydroxyl (—OH) groups tend to have an undesirably high rate of reaction with isocyanate groups, it is generally preferred to use comonomers having —$CONH_2$ groups, particularly acrylamide and methacrylamide whose copolymerisation is well known.

The copolymerisation required to obtain the modified thermoplastic polymers may be effected by known processes and the methods and details of preparation peculiar to any particular combination of monomers may be deduced from simple experiment by any chemist with ordinary skill in the art of polymerisation.

While block or graft copolymers may be used in our compositions, random copolymers are the most suitable and therefore, as is well known, where monomers of widely differing reaction rates are to be copolymerised it may be necessary to add at least the more reactive monomer continuously to the polymerisation vessel.

To retain the essential character of the thermoplastic polymer, it is generally preferred to retain a major part, e.g. 99 to 60% by weight, of the principal monomer or monomers in the copolymer. On the other hand, the incorporation of at least 5% and generally from 5 to 25% by weight of comonomer having the active hydrogen atom is generally desirable in order to obtain products showing usefully reduced tendencies to flow on heating after they have been cross-linked.

To form the compositions of our invention the copolymers containing active hydrogen atoms are then combined with polyisocyanate-generators. By a polyisocyanate-generator we mean a compound which is thermally dissociable to yield a compound containing two or more isocyanate groups, referred to herein as a polyisocyanate. Polyisocyanate-generators yielding diisocyanates are preferred.

Our experience with a wide variety of polyisocyanate-generators has shown that as a class they are generally thermally stable at moderately elevated temperatures and dissociate only at temperatures of above 120° C., and generally around 150° C. or higher, thereby allowing compositions containing them to be subjected to moderately elevated temperatures without cross-linking. We have not found a polyisocyanate-generator that dissociates much below 150° C. but if such a compound exists and is thermally dissociable at 120° C., it should be understood that it is excluded from our invention.

The actual dissociation temperatures of individual polyisocyanate-generators will vary from compound to compound and therefore it is possible, having regard to the nature of the copolymer and the shaping process for which it is designed, to choose from the general class of polyisocyanate-generators one or more compounds that have particularly suitable thermal dissociation characteristics; for example, so that the resulting composition may be shaped on conventional thermoplastic machinery without the need for drastic modifications and may thereafter be cross-linked by further heating. Ideally, the polyisocyanate-generator should be such that mild cross-linking is caused to occur during shaping, the extent of the cross-linking not being such as to interfere with successful completion of the shaping process by prematurely yielding an infusible material but being such that the minimum of additional heat treatment is required after shaping to obtain the desired improvements to the properties of the composition. Obviously, the choice of the polyisocyanate-generator to achieve this will depend (a) upon the nature of the copolymer, including the choice and relative concentrations of the constituent monomers, since this will determine to a first approximation the range of conditions that will have to be employed for shaping the composition, and (b) upon the nature of the thermoplastic shaping step, e.g. milling, extrusion, injection-moulding, compression moulding, pressing, vacuum-forming or rotational casting, since this will determine more exactly the temperature of the shaping step and will also determine the time for which the composition is held at that temperature. Thus, having established from the nature and intended end use of the copolymer the conditions that will be prevalent during fabrication, it is then possible to select a polyisocyanate-generator having a suitable dissociation temperature. The dissociation temperature of any polyisocyanate-generator may be established by simple experiment; for example, by observing the appearance of polyisocyanate species on a mass spectrometer.

The more readily available polyisocyanate-generators include urethanes of polyisocyanates (e.g. alkyl, aryl, aralkyl, alkaryl, alkylene or arylene urethanes), polymeric urethanes of polyisocyanates, uretidione dimers of polyisocyanates and urethanes and polymeric urethanes of uretidione dimers of polyisocyanates. Linear and cyclic polymers of polyisocyanates, cyanurate polymers of polyisocyanates, urethanes and polymeric urethanes of cyanurate polymers of polyisocyanates and linear high polymers of polyisocyanates containing the grouping —NK.CO— where K is an organic radical which may bear an isocyanate group or a polymerised form thereof may also be cited as polyisocyanate-generators, and cyclopolymeric alkylene diisocyanates, thermally dissociable Schiff's base adducts of polyisocyanates, thermally dissociable adducts of polyisocyanates with malonic or acetoacetic esters, thermally dissociable adducts of polyisocyanates with inorganic salts and thermally dissociable adducts of polyisocyanates with metallo-organic compounds form another but on the whole less readily available group.

Uretidione dimers of polyisocyanates, linear and cyclic polymers of polyisocyanates, cyanurate polymers of polyisocyanates and linear high polymers of polyisocyanates containing the grouping —NK.CO— may themselves be polyisocyanates e.g. diisocyanates, but this does not exclude them from use because in principle it does not matter if the generator itself reacts with the active hydrogen atoms in the copolymers below its dissociation temperature because the bridge so formed is thermally dissociable, e.g. as in the case of a uretidione.

The polyisocyanate-generators may be formed, for example, from diisocyanates, e.g. simple diisocyanates such as hexamethylene, benzene and toluene diisocyanates; benzene diisocyanates having one or more substituents in the aromatic nucleus (e.g. alkyl, alkoxy or halogen) as in mesitylene or chlorotoluene diisocyanates; diisocyanates in which isocyanate groups are attached to separate aromatic rings which are linked together either directly or via a bridging atom or group, and substituted (e.g. alkyl, alkoxy or halogeno) derivatives thereof; diisocyanates or higher polyisocyanates derived from the reaction of simple or polymeric polyols (including hydroxy-terminated polyethers and polyesters) with sufficient polyisocyanate to give at least two free isocyanate groups, and aryl or alkyl phosphorus or phosphoryl diisocyanates. Derivatives of other polyisocyanates may also be used, e.g. silicon tetraisocyanate, silane di- and tri-isocyanates which may have organic substitution on the silicon atom and phosphorus or phosphoryl tri-isocyanates.

Examples of our polyisocyanate-generators include the dissociable urethanes of any of the above-mentioned polyisocyanates, including the simple and polymeric urethanes of benzene, toluene, xylene and hexamethylene diisocyanates, halogeno- and alkoxy-substituted benzene diisocyanates and their hydrides; phenyl-, methyl-, ethyl-, propyl-, butyl-, 3,5,5-trimethylhexyl-; lauryl-, tridecyl-, tetradecyl, cetyl- and decamethylene-urethanes of toluene diisocyanates; the correspondng phenylurethanes having alkyl, halogeno or alkoxy substituents in the aromatic rings and polymeric arylene diurethanes of diisocyanates derived from dihydric phenols, for example resorcinol, hydroquinone and 2,2-(4,4'-dihydroxydiphenyl)propane; uretidione dimers of diisocyanates of benzene, toluene and xylene and their alkoxy and halogeno derivatives and of diphenylmethane, diphenyl ether, diphenyl propane, diphenyl sulphone and dodecahydrodiphenylmethane. The uretidione dimers of alkylene diisocyanates may also be used.

Other useful polyisocyanate-generators are the urethanes of polyisocyanate (especially diisocyanate) uretidione dimers derived from mono- and polyhydroxyl aliphatic, alicyclic and aromatic compounds, and the carbonyl diurethanes and oxalyl diurethanes derived from the same hydroxylic compounds.

Except in certain circumstances, e.g. the production of foamed products, it will generally be preferable to use a generator whose dissociation products are only polyisocyanates. Of these generators, the uretidiones are the most readily formed.

The uretidione dimers of toluene 2,4-diisocyanate and of 4,4'-diphenylmethane diisocyanate are preferred in combination with polymers having —$CONH_2$ groups because of their very suitable thermal dissociation characteristics, allowing for considerable flexibility in the conditions used for shaping.

The amount of polyisocyanate-generator that should be used in our composition is preferably related to the quantity of active cross-linkable radicals in the copolymer. However, the ratio of the two is not critical and may be varied within wide limits. It may not be desirable to use more of the polyisocyanate-generator than the stoichiometric quantity required for combination with all the reactive groups of copolymer, and even as little as 0.025 molar proportion of polyisocyanate-generator per molar proportion of reactive group produces a useful effect.

As already stated, the proportion of active units in the copolymer chain may be varied over a wide range and the degree of utilisation of these units may be varied at the discretion of the operator thereby giving a useful choice of cross-linkable compositions which may be adapted to diverse end requirements. For example, to obtain a partially cross-linked product a copolymer containing a low proportion of active units may be combined with a stoichiometric proportion of polyisocyanate-generator or a copolymer containing a higher proportion of active units may be combined with a less than stoichiometric proportion of polyisocyanate-generator. Alternatively, where it is desired to obtain a highly cross-linked composition a high proportion of active units may be used in the copolymer which is then combined with a stoichiometric quantity of polyisocyanate-generator.

By way of example, we have found that in the case of copolymers of ethylene containing from 10 to 20% by weight of methacrylic acid or acrylamide units, treatment with one quarter of the amount of polyisocyanate-generator required for complete reaction with all reactive groups will usually be found to give an adequate degree of cross-linking for the conferment of improved high temperature properties without undue loss of a desirable degree of flexibility and transparency in the product.

Our compositions may be formed by mixing the copolymer and polyisocyanate-generator in any suitable manner. For example, they may be blended on a malaxator such as a heated roll-mill at a temperature which is preferably sufficient to bring the copolymer into a fluid state but not above the dissociation temperature of the polyisocyanate-generator; temperatures of about 120° C., or possibly somewhat above, being generally satisfactory. In an alternative process the polyisocyanate-generator may be incorporated in a solution of the copolymer in a suitable solvent, but removing the last traces of solvent from the composition so formed is often both difficult and costly. If desired, the generator may also be blended with a homopolymer of the principal monomer of the copolymer and this blend may be mixed in suitable proportions with the copolymer.

In addition to the copolymer and polyisocyanate-generator components, our compositions may also contain further components, if desired. For example it may be useful to incorporate a catalyst for the thermal dissociation of the generator. Additionally, fillers such as graphite, carbon black, glass and asbestos fibre, finely divided metals and metal oxides, etc., may be added as may foaming agents, heat and u.v. stabilisers, pigments, dyes and the like.

Our compositions may be cross-linked by heating them above the dissociation temperature of the polyisocyanate-generator, i.e. generally to a temperature in excess of 150° C. For ethylene copolymers, the temperature is preferably 150° C. to 220° C., particularly 180 to 200° C., and for the copolymers of other monomers the preferred temperatures should be adjusted appropriately. The polyisocyanate-generator should be chosen accordingly. Because of the risk of oxidative degradation of many of the specified copolymers at the high temperatures sometimes involved, it may be desirable to conduct the cross-linking in an inert atmosphere.

If desired, and with suitable choice of operating conditions and/or polyisocyanate-generator, the compositions may be shaped before the cross-linking has proceeded to the extent that the material is no longer thermoplastic. Any of the usual shaping processes may be used. For example, the compositions may be injection-moulded, compression-moulded, extruded, pressed, vacuum-formed or rotationally cast. With careful choice of polyisocyanate-generator, a desired amount of cross-linking may be effected during the fabrication step thereby reducing the amount of additional heat required to complete cross-linking.

After the shaping step, the cross-linking, or the completion of the cross-linking, may be effected as desired.

The products may be used as pipes and sheathings for pipes and hoses, as wire and cable insulation and as moulded parts, e.g. in small engineering applications and in many other applications where use can be made of their resistance to oils and acids, their relatively low thermal expansion coefficients for plastics materials, their electrical insulation properties and their resistance to creep under load and to stress cracking. They may also be used in the form of foams and as heat shrinkable film and sheathings.

The invention is now illustrated with reference to polymers of ethylene but the chemist will recognise that it is equally applicable to polymers of other ethylenically unsaturated monomers, e.g. vinyl chloride, methyl methacrylate and styrene, by analogy.

In all the examples, all parts are expressed as parts by weight.

EXAMPLE 1

In this example, for the purposes of obtaining cross-linkable polymers active hydrogen atoms were introduced into an ethylene polymer by copolymerisation with acrylamide. The copolymer so formed contained 20.8% by weight (9.4 mole percent) of acrylamide and was further characterised by a melt flow index of 3.4 (characteristic of high molecular weight), a flexural modulus of 87,000 lbs./sq. in. and a Vicat softening point of 80.5° C.

In each of a number of experiments, a weighed portion of this ethylene/acrylamide copolymer was milled for ten minutes with a predetermined quantity of a selected polyisocyanate-generator on a 6-inch, steam-heated two-roll mill with a front roll at 105° C. and the rear roll at 60° C. That little or no cross-linking occurred during this treatment was reflected by the fact that the crepes so obtained could be pressed readily in the subsequent operation in which a 0.25 gm. sample of each crepe was then shaped by placing it between "Melinex"-lined aluminium plates ("Melinex" is a registered trademark) and pressing at 120° C., and a pressure varying between 200 and 6000 lbs./sq. inch, depending upon the choice of polyisocyanate generator, to give a disc with a diameter of 2 to 2¼ inches and a thickness of about 0.006 inch. In certain experiments, instead of milling, the generator was mixed with the copolymer as a solution in a suitable solvent and the composition was then placed under vacuum to remove traces of solvent.

A 1 inch x 1½ inch sample was then cut from each disc, clipped to a support and placed in a vessel under dry nitrogen. The vessel was then heated at 190° C. for 1 hour to cause the polyisocyanate generator to dissociate to yield polyisocyanate and to cause the polyisocyanate to react with the copolymer to cause cross-linking.

A ¾" x ⅛" strip of film was cut from each sample which had been so treated and its tendency to flow at elevated temperatures was estimated by measuring its stick temperature on a Kofler hot bar. This was compared with that of an untreated sample to show the effect of cross-linking after pressing. The temperature at which another identical strip of film from the sample lost its elasticity was also measured since this gave an indication of the temperature at which it lost its mechanical strength.

The results are tabulated on the following pages. Comparable results may be obtained by replacing the acrylamide with methacrylamide.

| Experiment | Polyisocyanate Generator | Stoichiometric Equivalent Added | Comparison of Stick Temps. of Pressed Samples | | Loss of Elasticity of Cured Sample, °C. | Comments |
|---|---|---|---|---|---|---|
| | | | Before Cure, °C. | After Cure, °C. | | |
| A | None | | 98 | 108 | | |
| B | Uretidione dimer of toluene 2,4,di-isocyanate. | 0.0625 | | 240 | 230/240 | *Transparent films (yellowish). Pressed and cured at 200° C. |
| | | 0.125 | Not meas-ured | *>260 | 245/255 | |
| | | 0.25 | | *>260 | 210 | |
| | | 0.5 | | *>260 | 194 | |
| | | 1.0 | | *>260 | 206 | |
| | | 2.0 | | *>260 | 206 | |
| C | Uretidione dimer of 4,4'-diphenyl-methane diisocyanate. | 1.0 | 156 | >260 | 215 | White films. |
| | | 0.5 | 160 | >260 | 210/220 | White film. |
| | | 0.25 | 175 | 225 | 210 | Do. |
| | | 0.125 | 140 | 210/220 | 210 | Translucent. |
| | | 0.125 | 140 | >260 | 210 | Generator added as a soultion in o-dichlorobenezene at 140° C. The sample was pressed and cured at 200° C. to give an almost transparent film. |
| D | OC⟨NH.CO.CH(CH₃)C₂H₅ / NH.CO.CH(CH₃)₂ | 0.25 | 0.099 | 97 | ~200 | 170 | Transparent film. |
| | | 0.5 | 1.180 | 96 | 200 | 140 | Do. |
| | | 1.0 | 0.360 | 94 | >260 | 130 | Do. |
| E | Bis methyl urethane of toluene 2,4-diisocyanate. | 0.25 | 0.086 | 101 | 220 | 180 | Transparent film. |
| | | 0.5 | 0.172 | 99 | 260 | 180 | Do. |
| | | 1.0 | 0.343 | 100 | >260 | 175/180 | Do. |
| F | Bis methyl urethane of the uretidione dimer of toluene 2,4-diisocyanate. | 0.25 | 0.0752 | 108 | >260 | 200 | Transparent film. |
| G | Bis phenyl urethane of the uretidione dimer of toluene 2,4-diisocyanate. | 0.25 | 0.1 | 112 | >260 | 180 | Transparent film containing some particle of curing agent. |
| | | 0.25 | 0.1 | 98 | >260 | 180 | Generator added as a solution in tetralin at 120° C. Transparent film—no inclusions. Yellowish. |
| | | 0.25 | 0.1 | 102 | >260 | 180 | |
| | | 0.25 | 0.1 | 102 | >260 | 180 | Generator added as a solution in tetralin at 120° C. Transparent film—some inclusions. Brownish. |
| H | Bis methyl urethane of 4,4'-diphenyl-methane diisocyanate. | 0.25 | 0.115 | 98 | >260 | 245 | Transparent film. |
| J | Bis methyl urethane of Bitolyl diisocyanate. | 0.25 | 0.12 | 102 | >260 | 220 | Transparent film. |
| K | Bis methyl urethane of Dianisidine diisocyanate. | 0.25 | 0.132 | 98 | 245/260 | 240 | Transparent film. |

| Experiment | Polyisocyanate Generator | Stoichiometric Equivalent Added | Pt. of Agent to 1 Part Copolymer | Comparison of Stick Temps. of Pressed Samples | | Loss of Elasticity of Cured Sample, °C. | Comments |
|---|---|---|---|---|---|---|---|
| | | | | Before Cure, °C. | After Cure, °C. | | |
| L | Bis methyl urethane of hexamethylene diisocyanate. | 0.25 | 0.085 | 98 | 120 | 120 draws to filaments | Transparent film. |
| M | Bis lauryl urethane of toluene 2,4-diisocyanate. | 0.125 | 0.1 | 100 | 240 | 150 elastic | Transparent film. |
| | | 0.25 | 0.2 | 97 | 230/240 | 195 elastic | Do. |
| | | 0.5 | 0.4 | 97 | 260 | 160 | Do. |
| N | Bis cetyl urethane of toluene 2,4-diisocyanate. | 0.25 | 0.242 | 96 | 255 | 230 | Transparent film. |
| P | Bis (3:5:5 trimethylhexyl) urethane of toluene 2,4-diisocyanate. | 0.25 | 0.17 | 100 | ~260 *~150 | ~260 *~150 | Transparent film. *Pressed and cured at 190° C. |
| R | Bis tridecyl urethane of toluene 2,4-diisocyanate. | 0.25 | 0.21 | 97 | ~265 *~150 | ~265 *~150 | Transparent film. *Pressed and cured at 190° C. |
| S | Bis iso $C_{13-18}$ alkyl urethane of toluene 2,4-diisocyanate. | 0.25 | 0.236 | 97 | *~250 | *~250 | Transparent film. *Pressed and cured at 190° C. |
| T | Trimethyl urethane of phosphoryl triisocyanate. | 0.25 | 0.065 | 100–103 | *120 | Not measured | *Pressed and cured at 195° C. Yellow transparent films. |
| U | A mixture of $O(C_2H_4OR)_2$ and $CH_2(OR).CH(OR).CH_2OR$ where R is $OC.NH.C_6H_3\text{-}(CH_3)NH.CO.OC_6H$. | 0.25 | 0.219 | 110 | 245 | 195 | Translucent film containing globules. |
| | | 0.5 | 0.437 | 107 | >260 | 200 | White film. |
| | | 1.0 | 0.875 | 105 | >260 | 210 | Do. |
| V | Polydecamethylene urethane of toluene 2,4-diisocyanate. | 0.25 | 0.064 | 110 | 210 | 150 draws to filaments | Almost transparent, contains globules. |
| | | 0.5 | 0.128 | 110 | 208 | 150 draws to filaments | Translucent, contains globules. |
| | | 1.0 | 2.255 | 114 | 210/214 | 160 | Do. |

EXAMPLE 2

Example 1 was repeated but this time a copolymer of ethylene and methacrylic acid containing 11.4% by weight (4.0 mole percent) of the acid was used. The copolymer had a melt flow index of 36, a flexural modulus of 27,000 lbs./sq. in., a Vicat softening point of 86° C. The process details were as described in Example 1.

The results are tabulated on the following pages from which it will be seen that in many of the products bubbling occurred, probably due to evolution of carbon dioxide as a result of reaction between the carboxylic acid (—COOH) groups and the polyisocyanates.

| Experiment | Polyisocyanate generator | Stoichiometric Equivalent Added | Comparison of Stick Temps. of Pressed Samples | | Loss of Elasticity of Cured Sample, °C. | Comments |
|---|---|---|---|---|---|---|
| | | | Before cure, °C. | After cure, °C. | | |
| A | None | | 96 | 100 | | |
| B | As for Example 1B | 0.65 | 175–180 | >260 | 140 | Bubbles visible in transparent film. |
| | | 1.3 | 112 | >260 | 110 | Do. |
| | | 2 | 130 | >260 | 110 | Do. |
| C | As for Example 1C. The catalyst used was 4-dimethylamino pyridine methiodide. | 1.0 | 102 | 120/130 | Draws to filaments | White translucent films containing crystal fragments. |
| | | 1.0+0.4% catalyst | 103 | 135 | 110 draws to filaments | Do. |
| | | 1.0+0.8% catalyst | 102 | 170 | 170 draws to filaments | Do. |
| | | 1.0+1.2% catalyst | 103 | 190/200 | 180 draws to filaments | Do. |
| | | 1.0+1.6% catalyst | 102 | 200 | 130 draws to filaments | Do. |
| D | As for Example 1E | 0.5 | 100 | 210 | 100 | Transparent film. |
| | | 1.0 | 96 | 220 | 120 | Translucent film containing microscopic bubbles. |
| | | 2.0 | 96 | 220 | 210 | Do. |
| E | As for Example 1D | 0.5 | 100 | 190 | 105 draws to filaments | Transparent film containing fine crystals. |
| | | 1.0 | 102 | 180 | do | Do. |
| | | 2.0 | 104 | 175 | 105 | Do. |
| F | As for Example 1U | 0.25 | 103 | 195 | 190 draws to filaments | Translucent film containing microscopic bubbles or globules. |
| | | 0.5 | 103 | 200 | 195 draws to filaments | Do. |
| | | 1.0 | 103 | 205 | 100–110 | Do. |

EXAMPLE 3

Example 1 was repeated using a copolymer of ethylene and 2-hydroxyethyl methacrylate and containing approximately 30% by weight (8.5 mole percent) of the ester. The copolymer had a melt flow index of 20. The process details were as described in Example 1 and the results are tabulated in the following tables.

uretidione dimer of toluene-2,4-diisocyanate and the uretidione dimer of 4,4'-diphenyl-methane diisocyanate.

6. A cross-linkable composition which is capable of being shaped, said composition comprising:
   (i) a copolymer containing 99% to 60% by weight of ethylene and 1% to 40% by weight of an ethylenically unsaturated carboxylic acid amide, and
   (ii) a uretidione dimer of an organic polyisocyanate.

| Experiment | Polyisocyanate generator | Stoichiometric Equivalent Added | Comparison of Stick Temps. of Pressed Samples | | Loss of Elasticity of Cured Sample, °C. | Comments |
|---|---|---|---|---|---|---|
| | | | Before cure, °C. | After Cure, °C. | | |
| A | None | | 80 | | 110 | Draws to filaments |
| B | As for Example 1A | 0.0313 | Cures on hot bar because of very rapid reaction of diisocyanate with OH groups. | °>260 | | Pressed sample transparent. Cured—shrunk. °Cured by heating for 30 mins. at 150° C. |
| | | 0.0625 | | *>260 | ~220* | Broke up on attempted pressing at 120° C. |
| | | | | ->260 | ~225- | *Pressed between PTME-coated plastics and cured at 195° C. -Cured at 195° C. |
| | | 0.125 | >260 | >260 | | Pressed sample crinkled surface. Transparent. |
| | | | Cures on bar | ->260 | >260- | -Cured at 200° C. Yellow transp. |
| | | 0.25 | | ->260 | >260- | -Cured at 200° C. Yellow transp. |
| | | 0.50 | | ->260 | >260- | -Cured at 200° C. Yellow transp. Crinkled surface. |
| | | 1.0 | | ->260 | 240- | -Cured at 200° C. Yellow transp. |
| C | As for Example 1C | 0.0625 | 240 cures on bar | >260 | >260 | |

| Experiment | Polyisocyanate generator | Stoichiometric Equivalent Added | Pt. of Agent to 1 g. Copolymer | Comparison of Stick Temps. of Pressed Samples | | Loss of Elasticity of Cured Sample, °C. | Comments |
|---|---|---|---|---|---|---|---|
| | | | | Before Cure, °C. | After Cure, °C. | | |
| D | As for Example 1E | 0.25 | 0.06 | 85 | >260 | 245-260 | Cured film transparent. |
| E | As for Example 1H | 0.25 | 0.091 | 86 | >260 | ~250 | Cured film transparent. |
| F | As for Example 1F | 0.25 | 0.068 | 89 | °246 | °237 | °Cured by heating for 1½ hrs. in oven at 190° C. Transparent film. |
| G | As for Example 1G | 0.25 | 0.078 | 110 | >260 | ~230 | Cured film transparent. |

What we claim is:

1. A process for the production of shaped, cross-linked articles which comprises heating a composition comprising:
   (i) a copolymer containing 99% to 60% by weight of ethylene and 1% to 40% by weight of an ethylenically unsaturated carboxylic acid amide, and
   (ii) a uretidione dimer of an organic polyisocyanate at a temperature at which the said copolymer is in a fluid state, shaping the composition with said copolymer in the fluid state, completing the shaping process before the composition is no longer thermoplastic and thereafter heating the shaped article at a temperature of from 150° C. to 200° C.

2. A process according to claim 1 in which the ethylenically unsaturated carboxylic acid amide is selected from the group consisting of acrylamide and methacrylamide.

3. A process according to claim 1 in which the ethylenically unsaturated carboxylic acid amide comprises from 5% to 25% by weight of the copolymer.

4. A process according to claim 1 in which the uretidione dimer is present in an amount of from 0.025 to 1 molar proportion per molar proportion of ethylenically unsaturated carboxylic acid amide in the copolymer.

5. A process according to claim 1 in which the uretidione dimer is selected from the group consisting of the

References Cited

UNITED STATES PATENTS

| | | | |
|---|---|---|---|
| 3,025,267 | 3/1962 | Calfee | 260—77.5 |
| 3,025,268 | 3/1962 | Deex et al. | 260—77.5 |
| 3,025,269 | 3/1962 | Calfee | 260—77.5 |
| 3,028,367 | 4/1962 | O'Brien | 260—77.5 |
| 3,036,045 | 5/1962 | Short et al. | 260—77.5 |
| 3,084,182 | 4/1963 | McElroy | 260—471 |
| 3,178,380 | 4/1965 | Porret | 260—21 |
| 3,313,789 | 4/1967 | Naarmann et al. | 260—80.5 |
| 3,245,941 | 4/1966 | Mayer et al. | 260—31.6 |
| 3,284,415 | 11/1966 | Horvath | 260—77.5 |

FOREIGN PATENTS

| | | |
|---|---|---|
| 610,203 | 12/1960 | Canada. |
| 802,740 | 10/1958 | Great Britain. |
| 1,052,680 | 3/1959 | Germany. |

DONALD E. CZAJA, *Primary Examiner.*

F. McKELVEY, *Assistant Examiner.*

U.S. Cl. X.R.

117—232; 260—2.5, 41, 86.7, 88.1, 858; 264—175